United States Patent Office 3,511,827
Patented May 12, 1970

---

3,511,827
METALLIZED MONOAZO DYE FOR NYLON
Roderick H. Horning, Reading, Pa., assignor to Crompton & Knowles Corporation, Worcester, Mass., a corporation of Massachusetts
No Drawing. Filed Apr. 4, 1968, Ser. No. 718,940
Int. Cl. C09b *45/18;* D06p *1/10*
U.S. Cl. 260—151    7 Claims

---

ABSTRACT OF THE DISCLOSURE

Compounds of the formula:

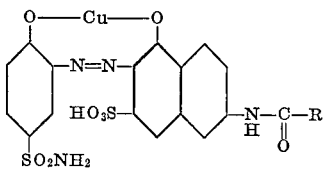

wherein R is either phenyl, tolyl, chlorophenyl, dichlorophenyl, nitrophenyl or methoxyphenyl which compounds are suitable for dyeing nylon in red shades.

---

This invention relates to a composition having the structure

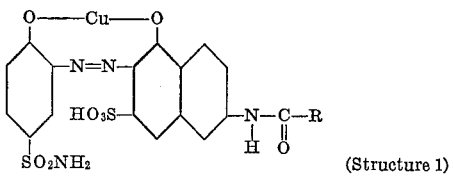

(Structure 1)

wherein R is either phenyl, tolyl, chlorophenyl, dichlorophenyl, nitrophenyl or methoxyphenyl.

The compounds of this invention are useful as dyes; they will dye nylon in red shades of excellent washfastness from aqueous dyebaths and they have the capability of being applied from neutral range (pH 6.5–8.5) dyebaths and with a good rate of exhaustion even at mildly alkaline pH's.

A related compound, Color Index Direct Violet 46 (CI No. 17515), has the structure

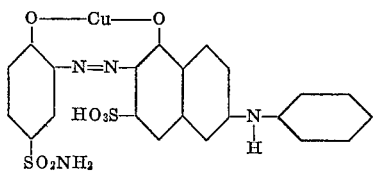

Direct Violet 46 is known to be useful as a dye for cellulose, silk, leather and paper. Other than the fact that it is said to dye nylon and stain acetate, the Color Index is silent as to the properties and characteristics of nylon dyeings prepared therefrom or the techniques to be employed in dyeing nylon therewith.

As compared with Direct Violet 46, the dyes of this invention show improved acetate reserve (i.e., they do not significantly stain acetate). This feature is of particular significance in the finishing of nylon-acetate blends when it is desired to dye nylon articles and leave acetate effect threads white.

Further, dyes of the present invention show improved fastness to light and to washing as compared with Direct Violet 46. The higher standards of performance demanded in the consumer market place today frequently necessitate use of dyestuffs with the best available light fastness and/or wash fastness.

Further, dyes of the present invention are closer to true red shades, i.e., they are less blue, than Direct Violet 46. This fact makes them of considerably greater value as dyestuffs because they can be used in many more compound shades such as grey, tan and brown.

The dyes of the present invention are produced by diazotizing 2-aminophenyl-4-sulfonamide and coupling it to a naphthol of the following structure

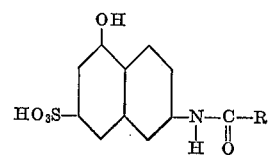

(wherein R has the meaning previously assigned to it) and treating the resulting azo compound with a copper salt. The naphthol is prepared by reacting J acid (1-naphthol-7-amino-3-sulfonic acid) with an appropriate aroyl halide having the structure

(wherein R has the meaning previously assigned to it and X is selected from the group consisting of bromo and chloro) in the manner well known to those skilled in the art.

The following examples will serve to illustrate how the compounds of this invention can be prepared. In these examples unless otherwise indicated, parts are by weight, temperatures are in degrees centigrade and percentages are percentages by weight.

EXAMPLE 1

An 18.8 g. portion of 2-aminophenol-4-sulfonamide was slurried in 250 ml. water and dissolved by the addition of 5 g. sodium hydroxide. The solution was acidified by the addition of 25 ml. concentrated hydrochloric acid and ice was added to lower the temperature to 10–15° C. A solution of 7 g. sodium nitrite was added slowly and the reaction was stirred for 15 minutes. The excess nitrite was removed by the addition of a small amount of sulfamic acid.

A 34.3 g. portion of 7-(N-benzoyl amino)-1-naphthol-3-sulfonic acid (prepared by reacting J acid with benzoyl chloride) was dissolved in 200 ml. water by adding soda ash to pH 8, an additional 25 g. soda ash was added and sufficient ice to lower the temperature to 5° C. was added. The diazotized 2-aminophenol-4-sulfonamide prepared above was then added. The temperature of the reaction mixture was 13° C., the volume 850 ml. and the pH 8.3. The pH was raised to 9.1 by adding 20 g. soda ash. The reaction mixture was stirred overnight and the precipitated product was separated by filtration. The resultant paste was reslurried in 500 ml. water and the pH reduced to 4.9 by the addition of 19 ml. glacial acetic acid. The slurry was heated to 75° C. and 100 ml. of 1 M copper sulfate solution was added. The pH was raised from 3.5 to 4.6 by adding 5 g. sodium acetate and the mixture was heated at 90–95° C. for 2 hours. The filterability of the resulting product was improved by adding 10% salt, raising the pH to 10.0 with 20% sodium hydroxide solution and lowering the pH to 6.5 with glacial acetic acid. The dyestuff was separated by filtration and dried. The dye had the structure:

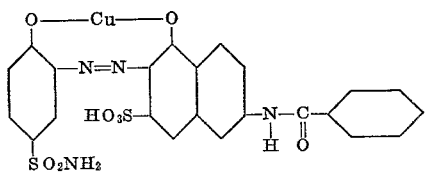

The product dyes nylon from neutral range baths in red shades which show outstanding light fastness and excellent wash fastness.

Alternatively, the metallization may be performed without separating and reslurrying the intermediate azo compound.

EXAMPLE 2

Stock solutions of dye concentrate from Example 1 were prepared by dissolving 1 g. of dye to 500 ml. soft water.

Three dyebaths were prepared by diluting 6.25 ml. stock solution to 300 ml. with soft water. Three additional dyebaths were prepared by diluting 25 ml. stock solution to 300 ml. with soft water. Six five gm. pieces of dull nylon tricot were wet out in soft water, hung on stainless stirrers, placed in the above dyebaths and the baths were placed in an automatic dye stove at 210–212°. Mechanical stirring is continued for ½ hour after reaching the boil and the dyeings were exhausted by adding the following to one bath of each concentration: Neutral—5 ml. 20% NaCl (to give a pH of about 7.5–8.0); MSP—5 ml. 10% Mono Sodium Phosphate (to give a pH of about 5.5–6.0); and Acid—5 ml. 5% acetic acid (to give a pH of about 3.2–4.0). Dyeings are continued ½ hour longer at the boil, removed from the bath, rinsed in tap water and dried. Dyeings are ¼% and 1%.

Exhausts are run by entering an additional 5 g. piece of dull nylon tricot to the dyebath after adjusting the volume to 300 ml. 5 ml. 5% acetic acid is added and the bath is stirred ½ hour, the fabric is removed, rinsed in tap water and dried. The dyeing from the "Neutral" exhaust was of noticeably greater depth than the counter-part exhaust dyeing obtained by adding the HAc to the Neutral bath at the completion of the initial dyeing.

By following the procedures of Example 1, dyes were prepared from naphthol coupling components prepared by reacting J acid with various aroyl halides:

| Example | Aroyl Halide Precursor for Naphthol | Dye in which R is— |
|---|---|---|
| 3 | o-Chlorobenzoylchloride | ![o-Cl-phenyl] |
| 4 | m-Chlorobenzoylchloride | ![m-Cl-phenyl] |
| 5 | p-Chlorobenzoylchloride | ![p-Cl-phenyl] |
| 6 | 2,4-dichlorobenzoylchloride | ![2,4-diCl-phenyl] |
| 7 | m-Nitrobenzoylchloride | ![m-NO2-phenyl] |
| 8 | p-Nitrobenzoylchloride | ![p-NO2-phenyl] |

Each of the dyestuffs of Examples 3–8 dyed nylon in red shades using procedure of Example 2, showed good neutral range exhaustion characteristics on nylon and possessed outstanding light fastness and excellent wash-fastness.

If the

group in the Structure I dye is replaced with $-SO_2-$, the resulting dyes surprisingly do not show as good neutral exhausting properties as the dyes of this invention.

It is also to be understood that the sulfonic group may be present as the free acid or a salt of the acid such as sodium. Use of the free acid form in representing the structure is not intended to limit the dyes to this structure but is intended to include the salts such as sodium, potassium and ammonium.

I claim:

1. A compound having the structure

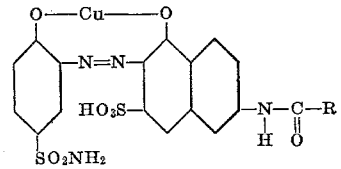

wherein R is phenyl, tolyl, chlorophenyl, dichlorophenyl, nitrophenyl or methoxyphenyl.

2. A compound according to claim 1 wherein R is

3. A compound according to claim 1 wherein R is

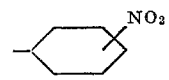

4. A compound according to claim 1 wherein R is

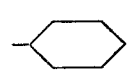

5. A compound according to claim 1 wherein R is

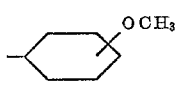

6. A compound according to claim 1 wherein R is

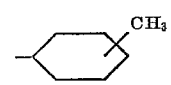

7. A compound according to claim 1 wherein R is

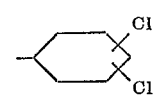

References Cited

UNITED STATES PATENTS 3,102,110  8/1963  Schetty et al. _____ 260—151

CHARLES B. PARKER, Primary Examiner

D. M. PAPUGA, Assistant Examiner

U.S. Cl. X.R.

8—42, 55; 260—198, 199